(12) United States Patent
Davila et al.

(10) Patent No.: US 8,642,885 B2
(45) Date of Patent: Feb. 4, 2014

(54) ELECTRICAL ENCLOSURES WITH REMOVABLE END PLATE

(75) Inventors: Luis Garcia Davila, Mexico City (MX); Ivan Diaz Chavez, Mexico City (MX)

(73) Assignee: Schneider Electric USA, Inc., Palatine, IL (US)

( * ) Notice: Subject to any disclaimer, the term of this patent is extended or adjusted under 35 U.S.C. 154(b) by 134 days.

(21) Appl. No.: 13/312,300

(22) Filed: Dec. 6, 2011

(65) Prior Publication Data

US 2013/0140080 A1    Jun. 6, 2013

(51) Int. Cl.
*H05K 5/00* (2006.01)

(52) U.S. Cl.
USPC ............................................ 174/50; 361/643

(58) Field of Classification Search
USPC ................................ 174/50, 53, 66; 361/643
See application file for complete search history.

(56) References Cited

U.S. PATENT DOCUMENTS

| | | |
|---|---|---|
| 3,386,606 A | 6/1968 | Pastrick |
| 4,036,396 A | 7/1977 | Kennedy et al. |
| 4,679,867 A | 7/1987 | Heldenbrand et al. |
| 5,118,001 A | 6/1992 | Gambill |
| 5,378,854 A * | 1/1995 | Hoover ............................ 174/53 |
| 5,596,174 A * | 1/1997 | Sapienza ........................... 174/57 |
| 5,870,276 A | 2/1999 | Leach et al. |
| 6,359,222 B1 | 3/2002 | Norvelle |
| 6,751,913 B2 | 6/2004 | Marrotte et al. |
| 7,141,736 B2 * | 11/2006 | Plankell ............................ 174/50 |
| 7,286,339 B2 | 10/2007 | Baca |
| 7,706,135 B2 | 4/2010 | Sharp et al. |
| 2010/0243315 A1 | 9/2010 | Shumate et al. |
| 2010/0258559 A1 | 10/2010 | Robinson et al. |

\* cited by examiner

*Primary Examiner* — Hung Ngo
(74) *Attorney, Agent, or Firm* — Locke Lord LLP

(57) ABSTRACT

Electrical enclosure assemblies, electrical service enclosures, and methods of assembling an electrical enclosure assembly are presented herein. An electrical enclosure assembly for housing electrical components of an electrical distribution system is disclosed. The enclosure assembly includes a plurality of sidewalls interconnected to define therebetween a mounting space within which are mounted the electrical components, and define at one end thereof an open endface. An endwall guide extends from one or more of the sidewalls into the mounting space. The endwall guide includes a plurality of elongated slots, a plurality of projections, or both. The enclosure assembly also includes an endwall configured to at least partially close off the open endface. The endwall includes a plurality of elongated slots, a plurality of projections, or both. Each of the projections is configured to fit into and secure with a respective elongated slot to thereby removably mount the endwall to the sidewalls.

18 Claims, 5 Drawing Sheets

ELECTRICAL ENCLOSURES WITH REMOVABLE END PLATE

TECHNICAL FIELD

The present disclosure relates generally to electrical distribution systems, and more particularly to electrical enclosures and other protective housings for electrical components in an electrical distribution system.

BACKGROUND

Conventional utility networks supply utilities for commercial, residential and industrial purposes. In a typical electrical distribution system, for example, electrical energy is generated by an electrical supplier or utility company and distributed to consumers via a power distribution network. The power distribution network is often a network of electrical distribution wires (more commonly known as "electrical transmission lines") which link the electrical supplier to its consumers. Additional devices, such as bus bars, switches (e.g., breakers or disconnectors), power transformers, and instrument transformers, which are typically arranged in switch yards and/or bays, are automated for controlling, protecting, measuring, and monitoring of substations.

Typically, electricity from a utility is fed from a primary station over a distribution cable to several local substations. At the local substations, the supply is transformed by distribution transformers from a relatively high voltage on the distributor cable to a lower voltage at which it is supplied to the end consumer. From the local substations, the power is provided to industrial users over a distributed power network that supplies power to various loads. Such loads may include, for example, various power machines, lighting, HVAC systems, etc.

Electrical distribution panels (or "load centers") are used widely in residential and commercial applications to house and protect electrical components. In centrally located electrical power distribution centers, for example, several electrical distribution panels are mounted together to house the main disconnect switches, multimeter centers, circuit breaker units, and bus bar ducting systems. These power distribution centers include a main bus bar arrangement that functions to connect the main electrical service entrance with a number of branch circuits. Other distribution panel assemblies are also known, including breaker panels which operate to divide electrical power into subsidiary circuits, while providing a protective fuse or circuit breaker for each circuit.

Indoor electrical enclosures, such as low-voltage, circuit protection load centers, often have a protective box with an open side for access to the interior of the enclosure. Prior art distribution panel enclosures typically comprise a container made of folded sheet metal or joined metal panels. The enclosure, in turn, is covered by a trim panel that is attached to the box with screws or bolts. The trim panel generally has a hinged access door which can be opened and closed for access to the circuit breaker actuation handles or other components located inside the distribution panel. The individual electrical components are mounted on a back-plate or back-panel that is secured to the interior of the enclosure case. The enclosure can be either surface mounted on a wall with the sides of the load center exposed, or flush mounted between studs or finished wall support members such that the finished wall surface, when installed, will be approximately flush with the outside edge of the load center enclosure.

Electrical enclosures are often required to accommodate a variety of component layouts, including acclimatizing to layouts with different sizes, numbers and arrangements of electrical conduits that pass through the enclosure. Some endwalls are provided with preformed "knock-out" openings through which the cables pass. However, knockout openings cannot be provided to accommodate every conceivable component layout. In other designs, holes must be cut in the endwall(s) to install conduits or other raceways intended to enter the enclosed panelboard. Aligning the cutouts in the endwall with the conduit, however, is often a very difficult and time-consuming task as the installer is typically required to take the entire enclosure off the wall, align and cut the holes, and remount the enclosure on the wall. There is therefore a need for an electrical enclosure design that allows for modification of the enclosure endwalls without dismounting the entire enclosure and without undermining the structural integrity and weather-resistant nature of the enclosure.

SUMMARY

The ability to remove the enclosure endwalls in the field during the installation of a device or additional circuits is a common requirement in order to locate the openings for wiring the enclosed components by ensuring the proper connection of the enclosure with a corresponding wireway. Electrical enclosure assemblies are disclosed herein that enhance the capability for removing and installing the top and bottom endwall(s), while maintaining build requirements such as weatherproof protection and preventing unauthorized access. Some of the disclosed configurations minimize or otherwise eliminate the need for screws and other threaded fasteners to attach the endwalls. Since fewer/no openings in the endwall surfaces are required to remove and/or reinstall the endwall, the potential ingress of weather elements is minimized. Some of the disclosed configurations eliminate fasteners in locations that are difficult to access and, thus, difficult to manipulate with standard hand tools. Some of the disclosed configurations also prevent vandalism by packing the fasteners such that they cannot be removed from the outside of the enclosure. Additional benefits of some of the disclosed concepts include improving the alignment of electrical wires during installation without undermining the weatherproof nature or the restricted access requirements of the enclosure.

In accord with some of the disclosed concepts, an endwall can be attached to the enclosure in three steps: first, interlocking a set of projections (e.g., shoulder rivets) fastened to the endwall with complementary slots (e.g., keyholes) in brackets attached to the sidewalls of the enclosure; second, with the rivets inserted into the major opening of the keyholes, the endwall is slid in a predefined direction until the rivets touch a narrowed opening of the keyholes and holes located in the back of the endwall align with clearance holes located in the box blank; and, third, fasten the endwall (e.g., with screws) from the inside of the enclosure by using the concentric positions of the endwall and the box blank.

According to aspects of the present disclosure, an electrical enclosure assembly is presented for housing one or more electrical components of an electrical distribution system. The electrical enclosure assembly includes a plurality of sidewalls that are interconnected to define therebetween a mounting space within which are mounted the one or more electrical components. The sidewalls also define at a first end thereof an open endface. An endwall guide extends from one or more of the sidewalls into the mounting space. The endwall guide includes a plurality of elongated slots, a plurality of projections, or both. The electrical enclosure assembly also includes an endwall that is configured to at least partially close off the open endface. The endwall includes the other of the plurality of elongated slots, the plurality of projections, or both, Each of the projections is configured to fit into and secure with a respective one of the elongated slots to thereby removably mount the endwall to the one or more of the sidewalls.

Other aspects of the present disclosure are directed to an electrical service enclosure, which includes a parallelepiped enclosure box, a bottom endplate and a pan-shaped top hood. The enclosure box includes a right-side and a left-side enclosure sidewall, a backside enclosure wall, and open front, top, and bottom faces. A right-side endwall guide, which includes a first set of keyhole openings, extends from the right-side enclosure sidewall proximate to the open top face into the interior of the enclosure box. In addition, a left-side endwall guide, which includes a second set of keyhole openings, extends from the left-side enclosure sidewall proximate to the top face into the interior of the enclosure box. The enclosure box also includes a reinforcement panel that is attached to both the right-side and left-side enclosure sidewalls and extends into the interior of the enclosure box. The electrical service enclosure also includes an access door and a bottom endplate that is attached to one or more of the enclosure sidewalls of the enclosure box to thereby cover the open bottom face. A pan-shaped top hood covers the top face of the enclosure box. The top hood has an imperforate major-plane face and four hood walls extending therefrom. The hood walls are collectively configured to surround an outer periphery of the enclosure box proximate to the top face. A first pair of the hood walls each has a respective mounting rail extending inwardly therefrom and fitted with rivets for mating with the keyhole openings in a respective one of the endwall guides. A second pair of the hood walls includes a front hood wall that is configured to overlay the reinforcement panel, and a back hood wall that is configured to abut the backside enclosure wall of the enclosure box and be mechanically fastened thereto from inside the enclosure box. The bottom endplate, access door, and top hood are cooperatively configured to close off the open bottom face, front face, and top face, respectively, such that the electrical service enclosure is substantially weatherproof Other aspects of the present disclosure are directed to a method of assembling an electrical enclosure assembly for housing one or more electrical components of an electrical distribution system. The method includes: connecting a plurality of sidewalls to define therebetween a mounting space within which is mounted the one or more electrical components and define an open endface at one end thereof; attaching an endwall guide to one or more of the sidewalls such that the endwall guide extends into the mounting space, the endwall guide including a plurality of elongated slots or a plurality of projections, or both; providing a removable endwall that is configured to at least partially close off the open endface, the endwall including the other of the plurality of elongated slots or the plurality of projections, or both; and mounting the removable endwall to the one or more of the sidewalls by fitting each of the projections into a major portion of a respective one of the elongated slots, and sliding the endwall in a locking direction to thereby move each of the projections from the major portion into a narrowed portion of the respective one of the elongated slots.

The above summary is not intended to represent each embodiment or every aspect of the present disclosure. Rather, the foregoing summary merely provides an exemplification of some of the novel features included herein. The above features and advantages, and other features and advantages of the present disclosure, will be readily apparent from the following detailed description of the embodiments and best modes for carrying out the present invention when taken in connection with the accompanying drawings and appended claims.

Figure 1:
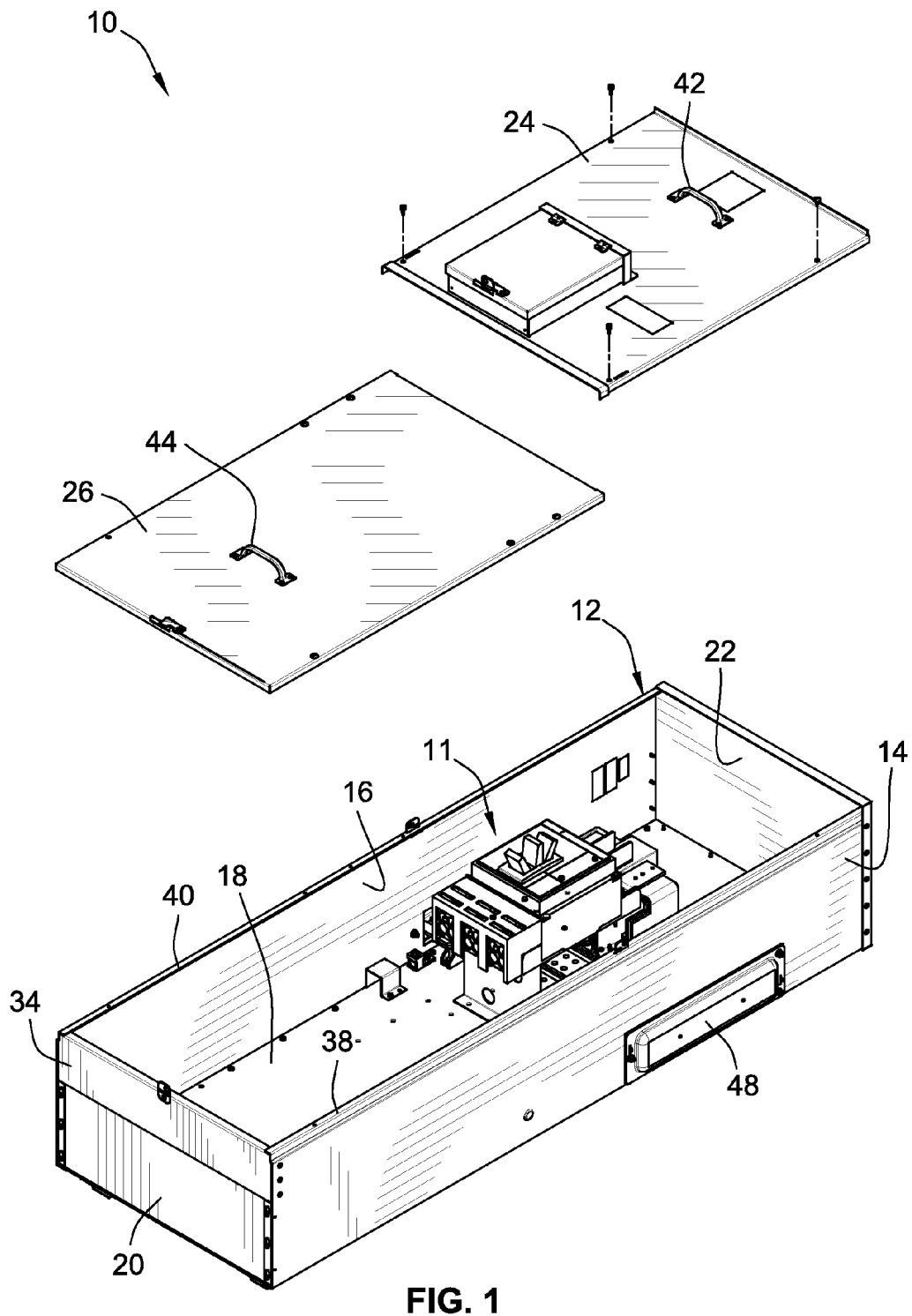
FIG. 1 is a partially exploded perspective-view illustration of an exemplary electrical enclosure assembly in accordance with aspects of the present disclosure.

While the present disclosure is susceptible to various modifications and alternative forms, specific embodiments have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of the invention as defined by the appended claims.

DETAILED DESCRIPTION

Referring now to the drawings, wherein like reference numerals refer to like components throughout the several views, FIG. 1 illustrates an exemplary electrical enclosure assembly, designated generally as 10, in accordance with aspects of the present disclosure. The electrical enclosure assemblies disclosed herein may take on various forms, some in the nature of an electrical service enclosure, panelboard, or load center, functioning to house one or more electrical components of an electrical distribution system. In the embodiment illustrated in FIG. 1, for example, the electrical enclosure assembly 10 is a 1000-1200 A Meter Center Main (Circuit Breaker) panelboard that houses, among other things, a circuit breaker 11, represented herein by a PGP36120U31A 1200 Amp, 3-Pole, 240 Volt, Bolt-On Circuit Breaker available from Schneider Electric (Square D Co.) of Saanichton, B.C. Canada. In some embodiments, the enclosures disclosed herein can be a rainproof NEMA Type 3R meter center for use on alternating current (AC) systems. The enclosures can also be suitable for use as service equipment, and can be suitable for use on the line side of service equipment. The enclosures can be provided with mounting brackets or other means for mounting the enclosure assembly to a mounting surface. In addition, the drawings presented herein are not to scale and are provided purely for instructional purposes. Thus, the specific and relative dimensions shown in the drawings are not to be considered limiting.

The electrical enclosure assembly 10 includes an enclosure box, indicated generally at 12, with a plurality of sidewalls that are interconnected to define therebetween a mounting space within which are mounted the electrical components (e.g., the circuit breaker 11) of the electrical distribution system. Although alternative shapes are certainly envisioned as being within the scope of the present disclosure, the enclosure box 10 of FIG. 1 is portrayed with a parallelepiped shape having six rectangular, generally flat outer faces. These faces are respectively defined by a first (or "right-side") enclosure sidewall 14, a second (or "left-side") enclosure sidewall 16, a backside enclosure wall (or "backpanel") 18, which is configured to attach with and support electrical components, a first endwall (or "bottom endplate") 20, a second endwall (or "top hood") 22, and a front-side wall which is collectively defined by a two-part access door (i.e., top and bottom covers 24 and 26, respectively). It is envisioned that the electrical enclosure assembly 10 include greater or fewer than six faces, each of which may take on a different size and/or shape than that which is shown in the drawings. In this regard, two or more of the enclosure walls may be formed as a single-piece structure, such as a piece of sheet metal that is bent or stamped into the desired form, for example.

The first and second enclosure sidewalls 14, 16 are interconnected, e.g., via the backside enclosure wall 18, to define a number of open faces. In the illustrated embodiment, for example, each of the sidewalls 14, 16 is a quadrilateral panel with one of more bent edges 15 and 17, respectively, extending generally orthogonally therefrom (see, e.g., inset view of FIG. 2 with enlarged illustration of sidewall 14 and bent edge 15). Each of the bent edges 15, 17 is attached to the backpanel 18 via Taptite® screws 32 or other attachment means, e.g., via rivets, bolts, crimping, or welding. In addition, a generally rectangular reinforcement panel 34 spans across the mounting space along a lower, forward portion of the electrical enclosure assembly 10 proximate an open bottom face 30 thereof. Closed-end rivets 36 or other attachment means attach each of the enclosure sidewalls 14, 16 to a respective lateral endwall (not visible in the views provided) of the reinforcement panel 34. Optionally, silicone caulking can be provided along the various joining regions, fastener holes, etc., of the electrical enclosure assembly 10 to ensure a proper weatherproof seal. In contrast to the removable bottom endplate 20, it may be desirable that the enclosure sidewalls 14, 16 and backside enclosure wall 18 be permanently attached together.

Figure 2:
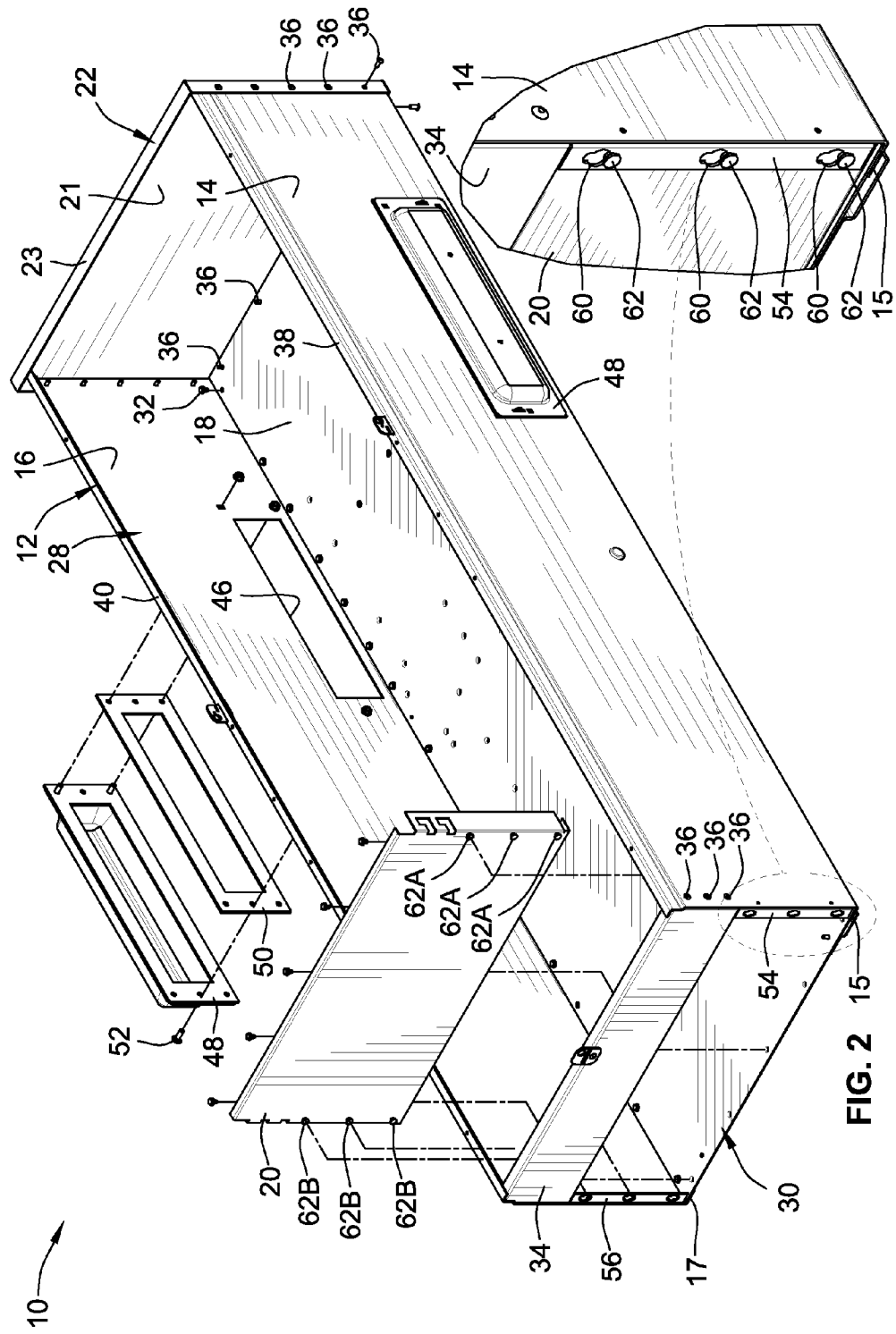
FIG. 2 is an alternative partially exploded perspective-view illustration of the electrical enclosure assembly of FIG. 1 shown without enclosure doors or a circuit breaker.
Figure 3:
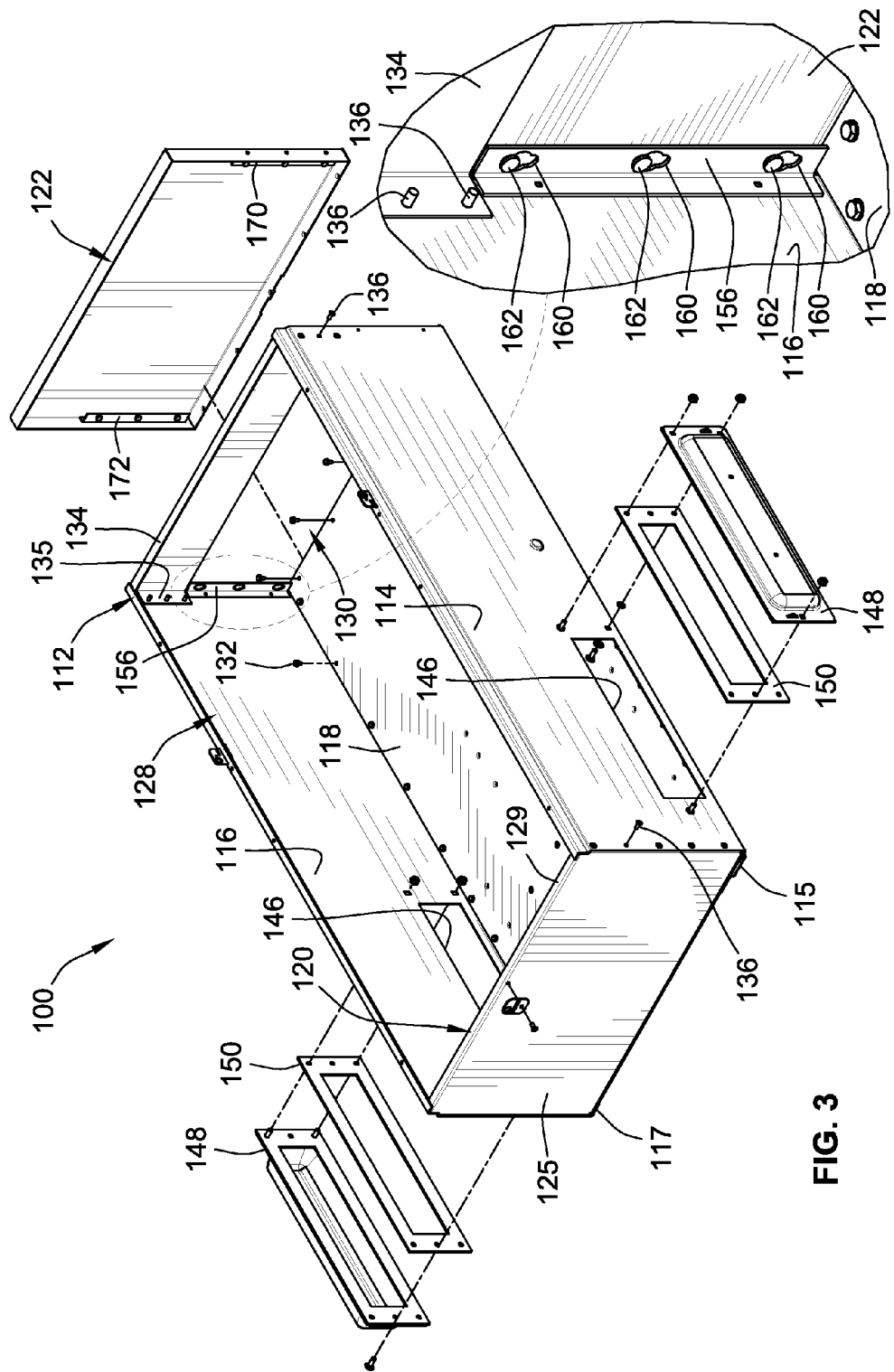
FIG. 3 is a partially exploded perspective-view illustration of another example of an electrical enclosure assembly in accordance with aspects of the present disclosure.

The enclosure sidewalls 14, 16 of FIGS. 1 and 2 cooperatively define an open front face 28, which provides access to the components housed inside the electrical enclosure assembly 10, and a first open endface (also referred to herein as "open bottom face") 30, which provides access, for example, for an underground line feed. By way of contrast, and not limitation, FIG. 3 is a partially exploded perspective-view illustration of another exemplary electrical enclosure assembly 100, which includes a first enclosure sidewall 114 and a second enclosure sidewall 116 that are interconnected via a backside enclosure wall 118 to define an open front face 128, which provides access to the inside the electrical enclosure assembly 100, and a second open endface (also referred to herein as "open top face") 130, which provides access, for example, for an overhead line feed. In optional configurations, an electrical enclosure assembly could be designed with both an open top face and an open bottom face.

In the embodiment of FIG. 1, the top hood 22 closes off and provides a generally weatherproof seal to the top face of the electrical enclosure assembly 10. The top hood 22 of FIGS. 1 and 2 includes a generally flat crown portion 21 with four edges that extend generally orthogonally from the crown portion 21 and are joined together (e.g., via welding) to form a flanged edge 23 that extends substantially continuously around an outer periphery thereof. The enclosure sidewalls 14, 16 are each attached to a respective lateral side-portion of the flanged edge 23, e.g., via closed-end rivets 36 or other attachment means. In contrast, the backpanel 18 is attached to a rear portion of the flanged edge 23, which may also be by way of closed-end rivets 36 or other attachment means. When properly seated on top of the enclosure assembly 10 and attached to the enclosure sidewalls 14, 16, as seen in FIG. 1, the flanged edge 23 of the top hood 22 fits around the outer periphery of the top endface. In so doing, the top hood 22 configuration operates to minimize or otherwise prevent the ingress of weather elements (e.g., rain, dust, snow, etc.) into the enclosure assembly 10. It may be desirable that the top hood 22 be permanently attached to the enclosure sidewalls 14, 16 and/or the backside enclosure wall 18. Alternatively, the top hood 22 can be configured, e.g., similarly to the top hood 122 of FIG. 3, to removably mount to the enclosure box 12.

With continuing reference to FIG. 1, an access door operates to at least partially close off the front face of the electrical enclosure assembly 10. The access door is portrayed in FIG. 1 as a two-part assembly with a top cover 24 and a bottom cover 26 which cooperatively close off the front of the enclosure assembly 10. To accommodate the access door, the electrical enclosure assembly is provided with a pair of tracks 38 and 40, each of which projects from a forward edge of the first and second enclosure sidewalls 14, 16, respectively, on the opposite side of the bent edges 15, 17. The door covers 24, 26 are mounted to the tracks 38, 40 of the enclosure sidewalls 14, 16 such that the door covers 24, 26 can be selectively transitioned (e.g., using door handles 42 and 44) from a closed position, whereat the door-covers 24, 26 generally seal the front of the enclosure assembly 10, to an open position, whereat the door-covers 24, 26 provide access to the mounting space within the enclosure assembly 10. In alternate arrangements, the access door can consist generally of a single door-panel, which can be slidably mounted to guide tracks or, alternatively, can be hinged to one or more of the sidewalls to provide a more traditional swinging door arrangement.

At least one, and in some embodiments both of the enclosure sidewalls 14, 16 includes a respective aperture 46 (or "cross bus opening") through which the enclosure assembly 10 can receive, for example, an electrical bus bar. Each aperture 46 is initially closed off by a respective side-cap assembly shown generally comprising a side cap 48 that spans and covers the aperture 46, as well as a gasket 50 that provides a mechanical seal between the side cap 48 and enclosure sidewall 16. As seen in FIG. 2, the side cap 48 and gasket 50 are removably attached to the left-side enclosure sidewall 16 via bolts 52 or other fastening means to facilitate installation of the electrical bus bar after the electrical enclosure assembly is already mounted.

Figure 5:
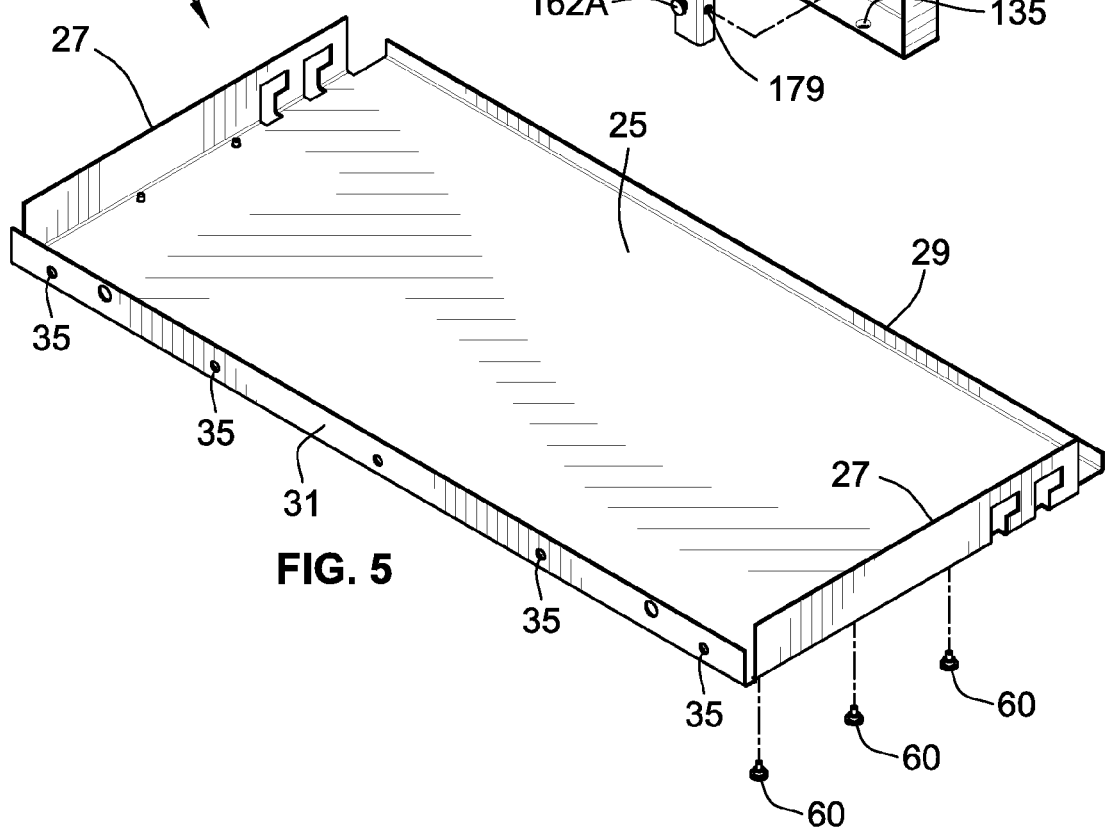
FIG. 5 is a perspective-view illustration of an exemplary removable bottom endwall in accordance with aspects of the present disclosure.

The bottom endplate 20 of FIGS. 1 and 2, in collaboration with the reinforcement panel 34, closes off and/or generally seals the open bottom face 30 of the electrical enclosure assembly 10. The bottom endplate 20 is shown in FIG. 5 as a generally rectangular, blank plate that is preferably fabricated, in at least some embodiments, from a material through which holes can be readily cut. The bottom endplate 20 includes a generally flat base portion 25 with a pair of opposing lateral edges 27, and a front lip 29 in opposing spaced relation to a rear edge 31, all of which extend generally orthogonally from the base portion 25. A number of through holes 35 are provided in the rear edge 31 to receive Taptite® screws 32 or other attachment means for rigidly securing the bottom endplate 20 to the enclosure box 12, e.g., via the backpanel 18. Optionally, the base portion 25 of the bottom endplate 20 can be fabricated with one or more pre-sized and positioned knockout openings.

Figure 6A:
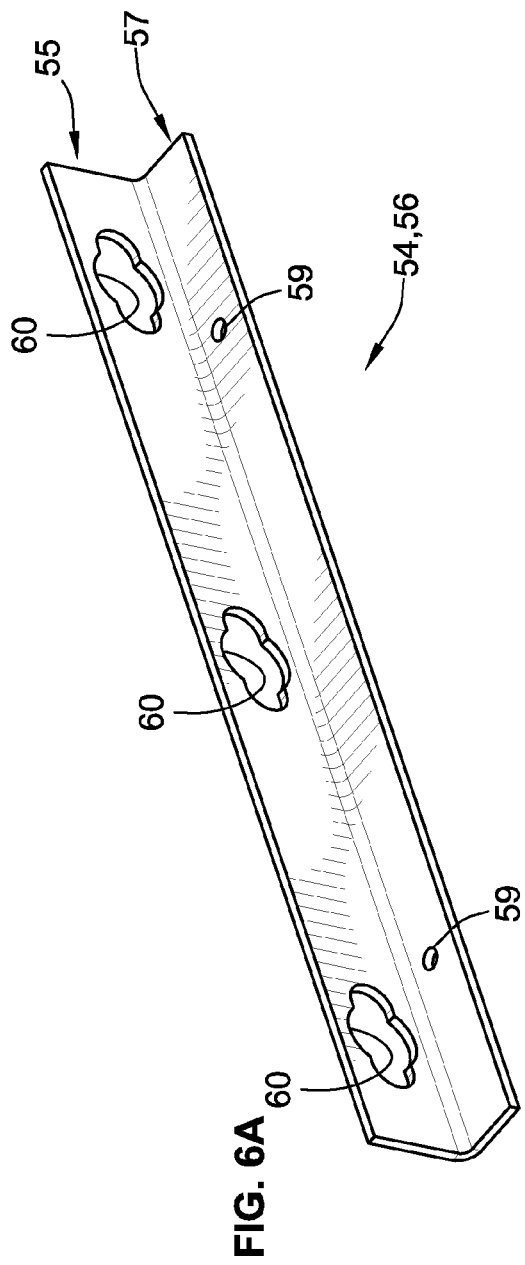
FIG. 6A is a perspective-view illustration of an exemplary endwall guide in accordance with aspects of the present disclosure.
Figure 6B:
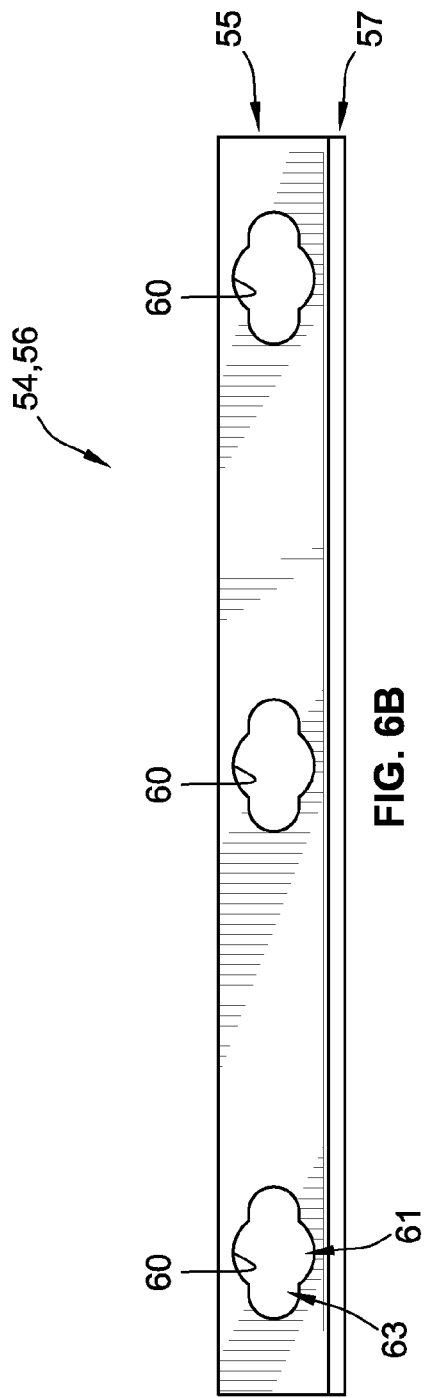
FIG. 6B is a front-view illustration of the exemplary endwall guide of FIG. 3A.

The bottom endplate 20 of FIG. 2 is removably attached to the enclosure assembly 10 such that the bottom endplate 20 can be removed before and/or after installing the electrical enclosure assembly 10. At least one, and in the illustrated embodiment two endwall guides—a first (or "right-side") endwall guide 54 and a second (or "left-side") endwall guide 56, are attached to and extend inwardly from the first and second enclosure sidewalls 14, 16, respectively, into the mounting space of the enclosure box 12. As best seen in FIGS. 6A and 6B, each of the endwall guides 54, 56 is an elongated L-shaped bracket with a stem portion 55 extending generally orthogonally from an arm portion 57. The arm portion 57 includes one or more rivet holes 59 through which rivets or other fastening means can be passed to thereby mount the endwall guide 54, 56 to the sidewalls of the enclosure box 12. In contrast, the stem portion 55 of the endwall guide 54, 56 includes a plurality of longitudinally spaced elongated slots 60 (also referred to herein as "first set of keyhole openings" for the first endwall guide 54 and "second set of keyhole openings" for the second endwall guide 54, or generally as "keyhole" or "keyholes").

The bottom endplate 20 removably mounts to the enclosure sidewalls 14, 16 of the enclosure box 12 by mating with and securing to the endwall guides 54, 56. In the illustrated embodiment, for example, the bottom endplate 20 includes a plurality of projections 62 which protrude from an outside surface thereof. In particular, a first set of flat-head projections 62A (e.g., shoulder rivets) is aligned along a right-hand side of the bottom endplate 20, and a second set of flat-head projections 62B is aligned along a left-hand side of the bottom endplate 20. As best seen in the inset view of FIG. 2, each projection 62 is configured to fit into and secure with a respective one of the elongated slots 60 of the endwall guide 54, 56 to thereby removably mount the bottom endplate 20 to the enclosure sidewalls 14, 16.

With reference again to FIGS. 6A and 6B, each of the elongated slots 60, commonly called a 'key hole' slot, includes a major portion 61 integrally formed with and connected to a narrowed portion 63. The major portion 61 is sized to receive therethrough the head of a respective projection 62. Contrastingly, the narrowed portion 63 is sized to receive therethrough the neck, but not the head of a respective projection 62. As such, sliding each of the projections from the major portion 61 to the narrowed portion 63 operates to secure the projection 62 in the elongated slot 60. In some embodiments a "two channel" key hole slot with a single, central large-diameter opening and two opposed, narrower channels extending therefrom can be used. The endwall guides 54, 56 are positioned, as seen in FIG. 2, such that the endwall 20 is disposed inside the mounting space between the enclosure sidewalls 14, 16 when the projections 62 secure with the elongated slots 60. In some embodiments, each of the projections is a pan-head rivet or a flat-head rivet. In alternative configurations, the bottom endplate 20 is fabricated with the elongated slots 60, and the endwall guides 54, 56 are fabricated with the projections 62. As another optional configuration, the bottom endplate 20 can be fabricated with both elongated slots 60 and projections 62, each of which mates with a complementary elongated slot 60 or projection 62 on one of the endwall guides 54, 56.

Referring next to FIG. 3, wherein like reference numerals refer to like components from FIGS. 1 and 2, another exemplary electrical enclosure assembly 100 is portrayed in accordance with aspects of the present disclosure. Unless indicated otherwise, the electrical enclosure assembly 100 can be similarly configured to the electrical enclosure assembly 10 and, thus, can include any of the options and alternatives described above with respect to the enclosure assembly 10 of FIGS. 1 and 2. By way of non-limiting example, the electrical enclosure assembly 100 also includes an enclosure box 112 with interconnected sidewalls that define therebetween a mounting space within which is mounted one or more electrical components of an electrical distribution system. The enclosure assembly 100 includes a first (or "right-side") enclosure sidewall 114, a second (or "left-side") enclosure sidewall 116, a backside enclosure wall (or "backpanel") 118, a first endwall (or "bottom endplate") 120, and a second endwall (or "pan-shaped top hood") 122. The electrical enclosure assembly 100 can also include an access door, such as the two-part cover assembly 24, 26 shown in FIG. 1. Each sidewall 114, 116 includes a bent edge 115 and 117, respectively, that is attached to the backpanel 118 via Taptite® screws 132 or other attachment means. In addition, a reinforcement panel 134 spans across the mounting space along an upper, forward portion of the electrical enclosure assembly 100 proximate the open top face 130 thereof. Closed-end rivets 136 or other attachment means attach each of the enclosure sidewalls 114, 116 to a respective lateral endwall 135 of the reinforcement panel 134 (only one of which is visible in FIG. 3, but a second, identical endwall is positioned at the opposite end of the reinforcement panel 134).

In contrast to the embodiment of FIGS. 1 and 2, the bottom endplate 120 of FIG. 3 is rigidly attached to the enclosure box 112, closing off and providing a generally weatherproof seal to the bottom face of the electrical enclosure assembly 100. The bottom endplate 120 includes a generally flat base portion 125 with opposing lateral edges (not visible in the view provided), a front lip 129, and a rear edge (not visible in the view provided), all of which extend generally orthogonally from the base portion 125. Taptite® screws 32 or other attachment means rigidly secure the bottom endplate 120 to the enclosure box 112, e.g., via the enclosure sidewalls 114, 116 and backpanel 118. Optional alternative arrangements may include the bottom endplate 120 being configured, e.g., similarly to the bottom endplate 20 of FIG. 2, to removably mount to the enclosure box 112.

Also similar to the enclosure assembly 10 of FIGS. 1 and 2, each of the enclosure sidewalls 114, 116 of FIG. 3 includes a respective aperture 146 (or "cross bus opening") through which the enclosure assembly 100 can receive, for example, an electrical bus bar. Each aperture 146 is initially closed off by a respective side-cap assembly shown generally comprising a side cap 148 that spans and covers the aperture 146, as well as a gasket 150 that provides a mechanical seal between the side cap 148 and enclosure sidewall 114, 116.

Figure 4:
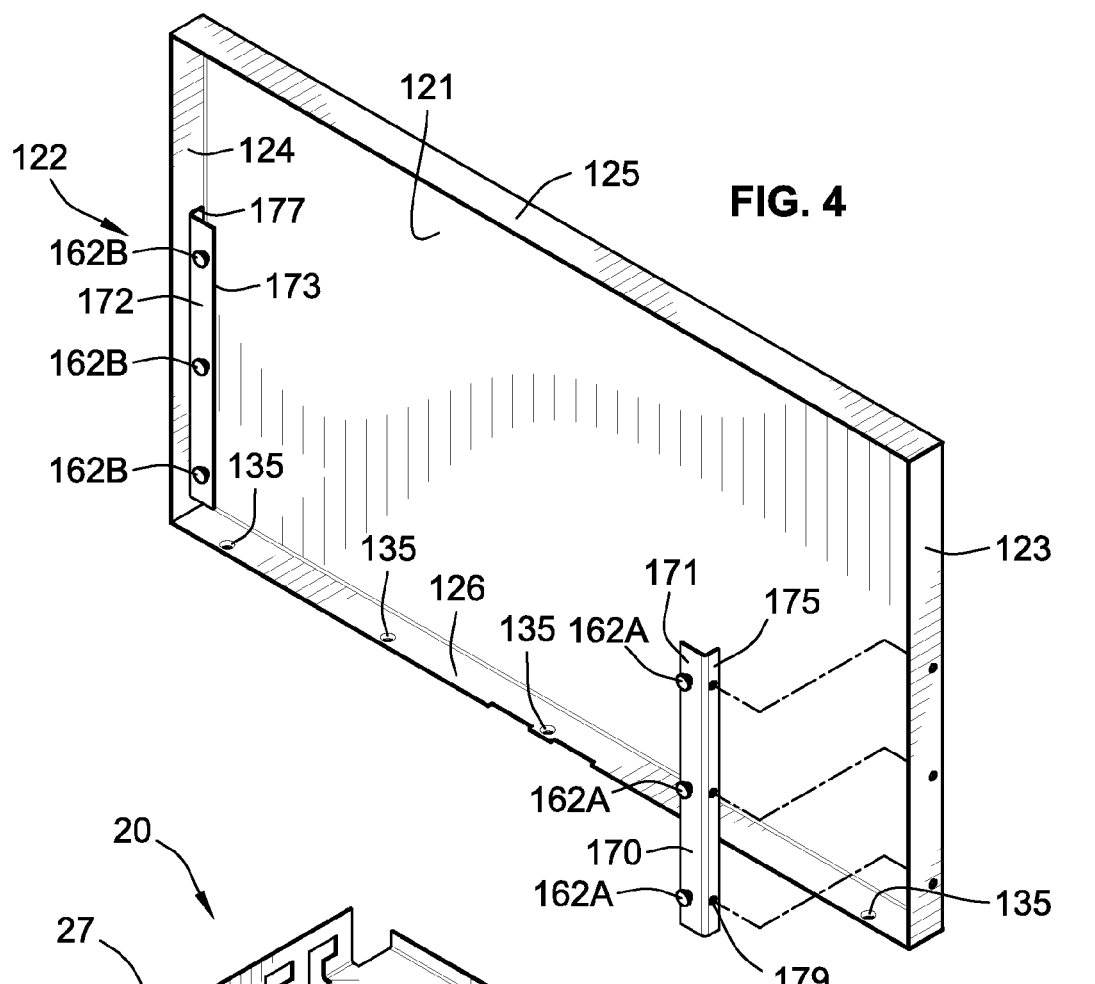
FIG. 4 is a perspective-view illustration of an exemplary removable top endwall in accordance with aspects of the present disclosure.

The top hood 122 of FIG. 3 closes off, covers, and/or generally seals the open top face 130 of the electrical enclosure assembly 100. The top hood 122 is shown in FIG. 4 with a generally flat and generally rectangular, imperforate crown portion 121 (also referred to herein as "major-plane face") that is preferably fabricated, in at least some embodiments, from a material through which holes can be readily cut. Four edges 123-126 (also referred to herein as "hood walls") extend generally orthogonally from the crown portion 121. The hood walls 123-126 are joined together (e.g., via welding) to form a flanged edge that extends substantially continuously around an outer periphery of the crown portion 121. When properly seated on top of the enclosure assembly 100 and secured to the enclosure sidewalls 114, 116, as developed in further detail below, the joined hood walls 123-126 fit around the outer periphery of the open top endface 130. For instance, a first pair of generally parallel, opposing hood walls 123, 124 are designed to abut or oppose the outside surfaces of the first and second enclosure sidewalls 114, 116, respectively. By way of contrast, a second pair of generally parallel, opposing hood walls includes a front hood wall 125 that is configured to overlay a front lip of the reinforcement panel 134, and a back hood wall 135 that is configured to abut the backside enclosure wall 118 of the enclosure box 112 and be mechanically fastened thereto from inside the enclosure box 112. To this end, a number of through holes 135 are provided in the rear wall 126, for example, to receive Taptite® screws 32 or other attachment means for rigidly securing the top hood 122 to the enclosure box 112, e.g., via the backpanel 118. In so doing, the top hood 122 configuration operates to minimize or otherwise prevent the ingress of weather elements (e.g., rain, dust, snow, etc.) into the enclosure assembly 100.

The top hood 122 of FIGS. 3 and 4 is removably attached to the enclosure assembly 100 such that the top hood 122 can be removed before and/or after installing the electrical enclosure assembly 100. At least one, and in the illustrated embodiment of FIG. 3 two endwall guides—a first (or "right-side") endwall guide with a first set of keyhole openings (e.g., right-side endwall guide 54 of FIG. 2) and a second (or "left-side") endwall guide 156 with a second set of keyhole openings, are attached to the first and second enclosure sidewalls 114, 116, respectively, proximate to the open top face 130, and extend inwardly into the mounting space of the enclosure box 112. Similar to the endwall guides 54, 56 of FIG. 2, the endwall guides of FIG. 3 can be structurally identical to the endwall guides illustrated in FIGS. 6A and 6B and, thus, can include any of the options and alternatives described above with respect to the endwall guides 54, 56 of FIG. 2.

The top hood 122 removably mounts to the enclosure sidewalls 114, 116 by mating with and securing to the one or more endwall guides of the enclosure box 112. In the embodiment illustrated in FIGS. 3 and 4, for example, the top hood 122 includes a pair of mounting rails—i.e., a first (or "right-side") mounting rail 170 and a second (or "left-side") mounting rail 172, each of which is attached to and projects inwardly from a respective hood wall 123, 124. As best seen in FIG. 4, each of the mounting rails 170, 172 is an elongated L-shaped bracket with a respective stem portion 171 and 173 that extends generally orthogonally from a respective arm portion 175 and 177. The arm portions 175, 177 each includes one or more rivet holes 179 through which rivets or other fastening means can be passed to thereby fasten the mounting rail 170, 172 to a respective hood wall 123, 124. In contrast, the stem portion 171 of the first mounting rail 170 includes a first set of flat-head projections 162A that are aligned along the right-hand side of the top hood 122, whereas the stem portion 173 of the second mounting rail 172 includes a second set of flat-head projections 162B that are aligned along the left-hand side of the top hood 122. Analogous to the embodiment of FIGS. 1 and 2, each projection 162 is configured to fit into and secure with a respective one of the elongated slots 160 of an endwall guide 156, as best seen in the inset view of FIG. 3, to thereby removably mount the top hood 122 to the enclosure sidewalls 114, 116. The mounting rails 170, 172 are shown projecting from inside surfaces of the top hood 122 such that the mounting rails 170, 172 attach to the endwall guides of the enclosure box 122 via securing the projections 162 with the elongated slots 160 inside the mounting space between the enclosure sidewalls 114, 116. The bottom endplate 120, access door (access door 24, 26 of FIG. 1), and top hood 122 are cooperatively configured to close off the bottom face, front face, and top face of the enclosure box 112, respectively, such that the electrical service enclosure 100 is substantially weatherproof.

In some of the disclosed embodiments, the removable endwalls eliminate the need to align conduits with pre-fabricated knockouts openings. The removable endwalls, according to some of the disclosed concepts, provide an expedient means for passing wire conduits through the top and/or bottom of the electrical enclosure. In so doing, the electrical panel enclosure can be installed before cutting the openings. The removable endwalls allow the user to easily remove and replace the endwall, and directly transpose conduit profiles after the electrical enclosure has been mounted.

Methods of assembling an electrical enclosure assembly are also disclosed herein. In some embodiments, the method is applicable to both the electrical enclosure assembly 10 of FIGS. 1 and 2 and the electrical enclosure assembly 100 of FIGS. 3 and 4. The method comprises, inter alia, connecting together a plurality of sidewalls (e.g., first and second enclosure sidewalls 14, 16) to define therebetween a mounting space within which can be mounted one or more electrical components of an electrical distribution system, and to define an open endface at one end thereof. This step may include fastening (e.g., via Taptite® screws 32) a portion of each enclosure sidewall to a backside enclosure wall (e.g., backpanel 18 of FIG. 2). The method also includes attaching one or more endwall guides (e.g., first and second endwall guides 54, 56) each to one or more of the enclosure sidewalls such that each endwall guide extends into the mounting space. Each endwall guide includes a plurality of elongated slots (e.g., keyholes 60 of FIGS. 6A and 6B), a plurality of projections (e.g., flat-head rivets 62 of FIG. 2), or both.

The method further comprises providing a removable endwall (e.g., bottom endplate 20 of FIG. 2 and/or top hood 122 of FIG. 3) that is configured to at least partially close off the open endface. The endwall includes the other of the plurality of elongated slots or the plurality of projections (or both). The method then includes mounting the endwall to the enclosure sidewalls by fitting each of the projections into a major portion (e.g., 61 of FIG. 6B) of a respective one of the elongated slots, and sliding the endwall in a locking direction (e.g., from the front to the rear of the enclosure box 12 of FIG. 2, or from the rear to the front of the enclosure box 112 of FIG. 3) to thereby move each of the projections from the major portion into a narrowed portion (e.g., 63 of FIG. 6B) of the respective one of the elongated slots. In so doing, the endwall is secured to the endwall guide(s) and, thus, the enclosure sidewall(s). The removable endwall may then be rigidly secured to the enclosure box, for example, by riveting the removable endwall to the backside enclosure wall.

In some embodiments, mounting the endwall to the enclosure box includes aligning one or more mounting rails projecting from the endwall (e.g., mounting rails 170, 172 of FIG. 4) with the endwall guide(s) such that the projections align with and fit into the elongated slots. In some embodiments, the mounting rail(s) projects from an inside surface of the endwall such that the mounting rail attaches to the endwall guide via securing the projections with the elongated slots inside the mounting space between the enclosure sidewalls. In other embodiments, the endwall guide(s) is positioned such that the endwall is disposed inside the mounting space between the enclosure sidewalls when the projections secure with the elongated slots. In some embodiments, the method includes at least those steps enumerated above. It is also within the scope and spirit of the present disclosure to omit steps, include additional steps, and/or modify the order presented above.

Words of approximation, such as "about," "substantially," "approximately," and the like, are used herein in the sense of "at, or nearly at," for example, when given the manufacturing, design, and material tolerances inherent in the stated circumstances and are used to prevent the unscrupulous infringer from unfairly taking advantage of this disclosure where exact or absolute figures and operational or structural relationships are stated as an aid to understanding the invention.

While exemplary embodiments and applications of the present disclosure have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims. To that extent, elements and limitations that are disclosed, for example, in the Abstract, Summary, and Detailed Description sections, but not explicitly set forth in the claims, should not be incorporated into the claims, singly or collectively, by implication, inference or otherwise.

What is claimed is:

1. An electrical enclosure assembly for housing one or more electrical components of an electrical distribution system, the electrical enclosure assembly comprising:
    a plurality of sidewalls interconnected to define therebetween a mounting space within which are mounted the one or more electrical components, each of the sidewalls including a quadrilateral panel with one of more edges extending generally orthogonally therefrom, the plurality of sidewalls being interconnected via the edges of the panels, the plurality of sidewalls also defining at a first end thereof an open endface;
    an endwall guide extending from one or more of the sidewalls into the mounting space, the endwall guide including a plurality of elongated slots or a plurality of projections, or both; and
    an endwall configured to at least partially close off the open endface, the endwall including the other of the plurality of elongated slots, the plurality of projections, or both, each of the projections being configured to fit into and secure with a respective one of the elongated slots to thereby removably mount the endwall to the one or more of the sidewalls.

2. The electrical enclosure assembly of claim 1, wherein the endwall includes a mounting rail projecting therefrom, the mounting rail including the other of the plurality of elongated slots and the plurality of projections.

3. The electrical enclosure assembly of claim 2, wherein the mounting rail projects from an inside surface of the endwall such that the mounting rail attaches to the endwall guide via securing the elongated slots with the projections inside the mounting space between the plurality of sidewalls.

4. The electrical enclosure assembly of claim 1, wherein the endwall includes the plurality of projections protruding from an outside surface thereof.

5. The electrical enclosure assembly of claim 1, wherein the endwall guide is positioned such that the endwall is disposed inside the mounting space between the plurality of sidewalls when the projections secure with the elongated slots.

6. The electrical enclosure assembly of claim 1, wherein the endwall guide comprises a plurality of endwall guides each attached to a respective one of the sidewalls and extending into the mounting space, each of the end wall guides including one of the plurality of elongated slots and the plurality of projections, the endwall removably mounting to the plurality of sidewalls via the plurality of endwall guides.

7. The electrical enclosure assembly of claim 1, wherein the plurality of sidewalls further defines a second open endface at a second end thereof opposite the first end, the enclosure assembly further comprising:
    a second endwall guide extending from one or more of the sidewalls into the mounting space, the second endwall guide including one of a second plurality of elongated slots and a second plurality of projections, or both; and
    a second endwall configured to at least partially close off the second open endface, the second endwall including the other of the second plurality of elongated slots and the second plurality of projections, or both, each of the projections being configured to fit into and secure with a respective one of the elongated slots to thereby removably mount the second endwall to the one or more of the sidewalls.

8. The electrical enclosure assembly of claim 1, wherein the endwall includes a crown portion with a flanged edge extending continuously or substantially continuously around an outer periphery of the crown portion, the flanged edge of the endwall being configured to fit around an outer periphery of the open endface.

9. The electrical enclosure assembly of claim 1, wherein each of the elongated slots includes a major portion attached to a narrowed portion, the major portion being sized to receive therethrough the respective projection, and wherein sliding the respective projection from the major portion to the narrowed portion operates to secure the projection to the elongated slot.

10. The electrical enclosure assembly of claim 9, wherein each of the projections is one of a pan-head rivet or a flat-head rivet.

11. The electrical enclosure assembly of claim 1, wherein the plurality of sidewalls further define an open front face, the electrical enclosure assembly further comprising an access door configured to at least partially close off the open front face, the access door being removably attached to one or more of the plurality of sidewalls to transition between a closed position and an open position to thereby provide access to the mounting space.

12. The electrical enclosure assembly of claim 1, further comprising a backpanel attached to one or more of the plurality of sidewalls, the backpanel being configured to attach with and support the electrical components.

13. The electrical enclosure assembly of claim 1, wherein one or more of the sidewalls includes an aperture extending therethrough, the electrical enclosure assembly further comprising a side-cap assembly removably attached to the sidewall and thereby covering the aperture.

14. The electrical enclosure assembly of claim 1, further comprising a reinforcement panel spanning across the mounting space and attached to two of the sidewalls.

15. An electrical service enclosure comprising:
    an enclosure box with a parallelepiped shape, the enclosure box having:
        a right-side and a left-side enclosure sidewall,
        a backside enclosure wall,
        an open front face, an open top face, and an open bottom face,
        a right-side endwall guide with a first set of keyhole openings and extending from the right-side enclosure sidewall proximate to the open top face into the interior of the enclosure box,
        a left-side endwall guide with a second set of keyhole openings and extending from the left-side enclosure sidewall proximate to the open top face into the interior of the enclosure box, and a reinforcement panel attached to the right-side and left-side enclosure sidewalls and extending into the interior of the enclosure box;

a bottom endplate attached to one or more of the enclosure sidewalls of the enclosure box thereby covering the open bottom face;

an access door; and a pan-shaped top hood covering the top face of the enclosure box, the top hood having an imperforate major-plane face and four hood walls extending therefrom, the hood walls being collectively configured to surround an outer periphery of the enclosure box proximate to the top face, a first pair of the hood walls each having a respective mounting rail extending inwardly therefrom and fitted with rivets for mating with the keyhole openings in a respective one of the endwall guides, a second pair of the hood walls including a front hood wall being configured to overlay the reinforcement panel, and a back hood wall being configured to abut the backside enclosure wall of the enclosure box and be mechanically fastened thereto from inside the enclosure box, wherein the bottom endplate, access door, and top hood are cooperatively configured to close off the open bottom face, front face, and top face, respectively, such that the electrical service enclosure is substantially weather-proof.

16. A method of assembling an electrical enclosure assembly for housing one or more electrical components of an electrical distribution system, the method comprising:

connecting a plurality of sidewalls to define therebetween a mounting space within which is mounted the one or more electrical components and define an open endface at one end thereof;

attaching an endwall guide to one or more of the sidewalls such that the endwall guide extends into the mounting space, the endwall guide including a plurality of elongated slots or a plurality of projections, or both;

providing a removable endwall configured to at least partially close off the open endface, the endwall including the other of the plurality of elongated slots or the plurality of projections, or both, the endwall including a crown with a flanged edge extending continuously or substantially continuously around an outer periphery of the crown; and mounting the removable endwall to the one or more of the sidewalls by fitting each of the projections into a major portion of a respective one of the elongated slots, and sliding the endwall in a locking direction to thereby move each of the projections from the major portion into a narrowed portion of the respective one of the elongated slots, the mounting of the endwall fitting the flanged edge around an outer periphery of the interconnected sidewalls.

17. The method of claim 16, wherein the endwall includes a mounting rail projecting therefrom, and wherein the mounting the endwall includes aligning the mounting rail with the endwall guide such that the plurality of projections align with and fit into the plurality of elongated slots.

18. The method of claim 17, wherein the mounting rail projects from an inside surface of the endwall such that the mounting rail attaches to the endwall guide via securing the projections with the elongated slots inside the mounting space between the plurality of sidewalls.

* * * * *